US012601372B2

(12) United States Patent
Grubaugh et al.

(10) Patent No.: US 12,601,372 B2
(45) Date of Patent: Apr. 14, 2026

(54) WHEEL BEARING ASSEMBLIES AND VEHICLES

(71) Applicant: ILJIN USA Corporation, Novi, MI (US)

(72) Inventors: Kelly Grubaugh, Canton, MI (US); Robert Sutherlin, Farmington Hills, MI (US)

(73) Assignee: ILJIN USA Corporation, Novi, MI (US)

( * ) Notice: Subject to any disclaimer, the term of this patent is extended or adjusted under 35 U.S.C. 154(b) by 129 days.

(21) Appl. No.: 18/218,975

(22) Filed: Jul. 6, 2023

(65) Prior Publication Data

US 2025/0012318 A1     Jan. 9, 2025

(51) Int. Cl.
    *F16C 19/18*         (2006.01)
    *F16C 33/80*         (2006.01)

(52) U.S. Cl.
    CPC .......... *F16C 19/185* (2013.01); *F16C 33/805* (2013.01); *F16C 2326/02* (2013.01)

(58) Field of Classification Search
    CPC ...... F16C 19/185; F16C 33/80; F16C 33/805; F16C 39/02; B60B 27/0005; B60B 27/001; B60B 27/0015; B60B 27/0073
    See application file for complete search history.

(56) References Cited

U.S. PATENT DOCUMENTS

| | | | |
|---|---|---|---|
| 8,845,203 B2 | 9/2014 | Meeker et al. | |
| 9,283,808 B2 | 3/2016 | Meeker et al. | |
| 2021/0140544 A1* | 5/2021 | Kato | B29C 45/0441 |
| 2022/0088963 A1* | 3/2022 | Re | F16C 33/7889 |

FOREIGN PATENT DOCUMENTS

| | | | | | |
|---|---|---|---|---|---|
| JP | 2010196830 A | * | 9/2010 | .......... | F16C 33/7876 |
| JP | 2017137973 A | * | 8/2017 | .......... | F16C 33/7879 |
| JP | 2017150625 A | * | 8/2017 | .............. | F16C 33/80 |
| KR | 20140007595 A | * | 1/2014 | .......... | F16C 33/7879 |
| KR | 20170103571 A | * | 9/2017 | ........ | B60B 27/0005 |
| KR | 1020180075530 A | | 7/2018 | | |
| KR | 1020180075531 A | | 7/2018 | | |
| WO | WO-2012107693 A1 | * | 8/2012 | ............ | F16C 19/186 |

OTHER PUBLICATIONS

Translation of JP2010196830 obtained Jan. 8, 2025.*
Translation of JP2017137973 obtained Jan. 8, 2025.*
Translation of WO2012107693 obtained Jan. 8, 2025.*

* cited by examiner

*Primary Examiner* — James Pilkington

(74) *Attorney, Agent, or Firm* — Dinsmore & Shohl LLP; Yongsok Choi, Esq.

(57)            ABSTRACT

A wheel bearing assembly is provided. The wheel bearing assembly includes an outer ring, a wheel hub rotating relative to the outer ring, the wheel hub including a hub flange, an inboard surface of the hub flange facing an outboard surface of the outer ring and spaced a gap apart from the outboard surface of the outer ring in an axial direction, a plurality of rolling elements rotatably coupling the outer ring and the wheel hub, a first spacer disposed between the inboard surface of the hub flange and the outboard surface of the outer ring, and a second spacer disposed between the first spacer and the outboard surface of the outer ring. At least a portion of the first spacer and at least a portion of the second spacer are disposed in the gap.

18 Claims, 6 Drawing Sheets

WHEEL BEARING ASSEMBLIES AND VEHICLES

BACKGROUND

Field

The present disclosure relates to wheel bearing assemblies and vehicles. More particularly, the present disclosure relates to wheel bearing assemblies including a spacer.

Technical Background

Wheel bearings are designed to support vehicle loads and allow wheels to rotate. Therefore, wheel bearings are designed to avoid noticeable noise or vibration to vehicles and passengers. Damage to wheel bearings may cause vehicle noise and vibration, which then may be heard or felt by passengers. The damage to wheel bearings may include Brinell damage, which is damage to raceways of wheel bearings including deformation, indentation, marking, or the like (e.g., Brinell marks). Brinell damage may be permanent material deformation and may typically occur due to rolling elements impacting the raceways. Brinell damage may be caused by excessive stress to the raceways. Brinell marks may generate noise that is audible to passengers in the vehicle.

BRIEF SUMMARY

In one embodiment, a wheel bearing assembly is provided. The wheel bearing assembly includes an outer ring, a wheel hub rotating relative to the outer ring, the wheel hub including a hub flange, an inboard surface of the hub flange facing an outboard surface of the outer ring and spaced a gap apart from the outboard surface of the outer ring in an axial direction, a plurality of rolling elements rotatably coupling the outer ring and the wheel hub, a first spacer disposed between the inboard surface of the hub flange and the outboard surface of the outer ring, and a second spacer disposed between the first spacer and the outboard surface of the outer ring. At least a portion of the first spacer and at least a portion of the second spacer are disposed in the gap.

In another embodiment, a vehicle is provided. The vehicle includes a wheel bearing assembly configured to be coupled to a wheel of the vehicle. The wheel bearing includes an outer ring, a wheel hub rotating relative to the outer ring, the wheel hub including a hub flange, an inboard surface of the hub flange facing an outboard surface of the outer ring and spaced a gap apart from the outboard surface of the outer ring in an axial direction, a plurality of rolling elements rotatably coupling the outer ring and the wheel hub, a first spacer disposed between the inboard surface of the hub flange and the outboard surface of the outer ring, and a second spacer disposed between the first spacer and the outboard surface of the outer ring. At least a portion of the first spacer and at least a portion of the second spacer are disposed in the gap.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1A:
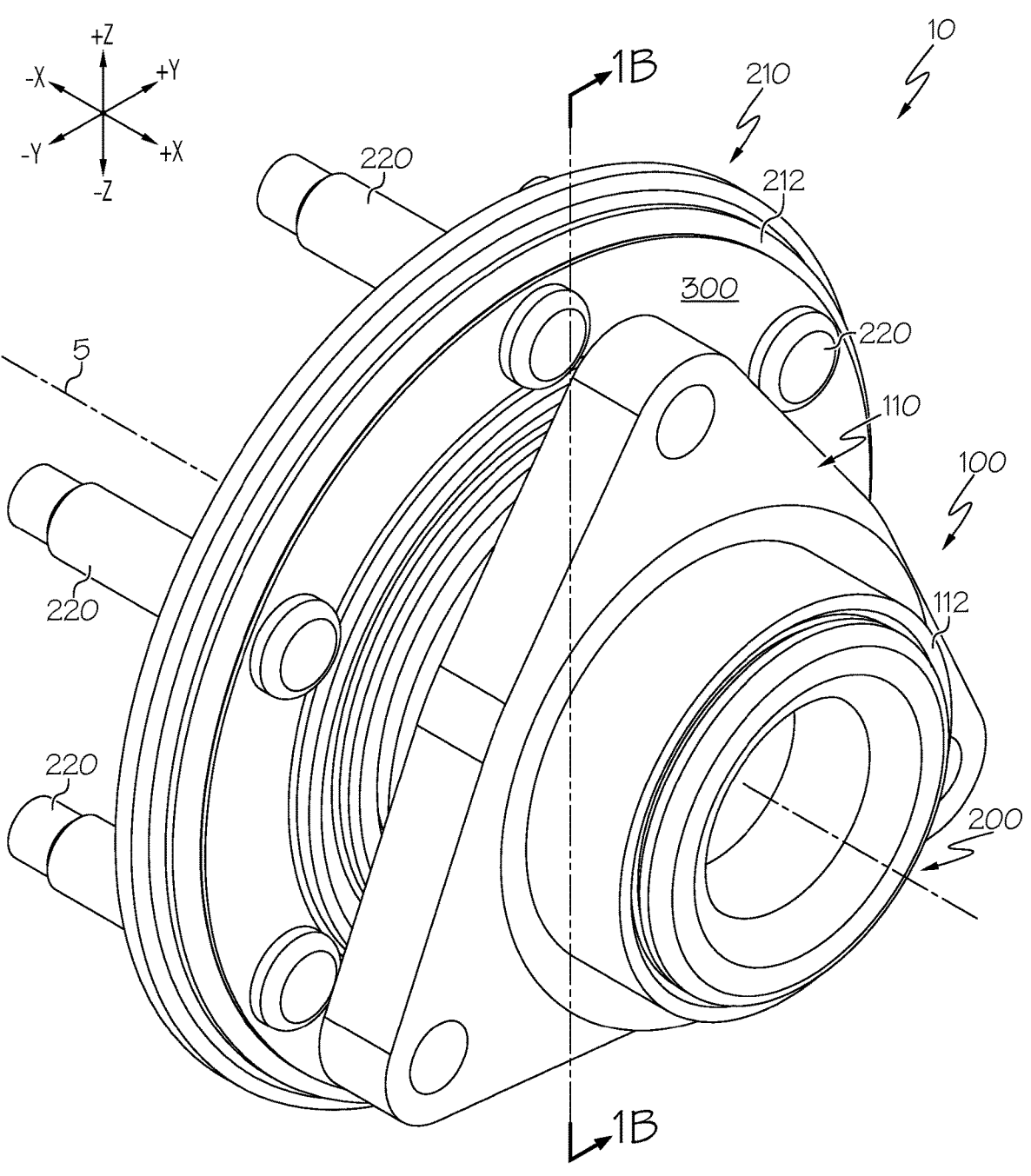
FIG. 1A schematically depicts a perspective view of a wheel bearing assembly, according to one or more embodiments shown and described herein.

Embodiments of the present disclosure are directed to wheel bearing assemblies. A wheel bearing assembly may have an outer ring, a wheel hub having a hub flange and rotatably coupled to the outer ring via a plurality of rolling elements, a first spacer disposed between an inboard surface of the hub flange and an outboard surface of the outer ring, and a second spacer disposed between the first spacer and the outboard surface of the outer ring. A gap (e.g., an axial space) is axially formed between the inboard surface of the hub flange and the outboard surface of the outer ring. While the gap may provide an impact load force path to that of the rolling elements and raceways of the outer ring where the rolling elements are disposed, the first spacer and the second spacer may absorb force applied to the wheel bearing assembly, specifically, absorb force from an axial impact on the wheel bearing assembly, which may be caused by a lateral impact on a vehicle with the wheel bearing assembly. The first spacer and the second spacer may prevent Brinell damage to the raceways and/or the rolling elements. At the same time, the first spacer and the second spacer may provide a labyrinth seal.

As used herein, the term "inboard direction" refers to the direction toward a longitudinal centerline of a vehicle when the wheel bearing assembly is installed to the vehicle (i.e., in the +X direction of the coordinate axes depicted in FIG.

1A). The term "outboard direction" refers to the direction away from the longitudinal centerline of the vehicle (i.e., in the –X direction of the coordinate axes depicted in FIG. 1A), and is transverse to the inboard direction. When the wheel bearing assembly is installed to the vehicle, a rotational axis of the wheel bearing assembly may align with the outboard-inboard direction (i.e., +/–X direction of the coordinate axes depicted in FIG. 1A). Therefore, the term "inboard" or "inward" as used herein refer to the relative location of a component along the rotational axis of the wheel bearing assembly with respect to the longitudinal centerline of the vehicle, and the terms "outboard" or "outward" as used herein refer to the relative location of a component along the rotational axis of the wheel bearing assembly with respect to the longitudinal centerline of the vehicle. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle. The term "vehicle longitudinal direction" refers to the forward-rearward direction of the vehicle (i.e., in the +/–Y direction of the coordinate axes depicted in FIG. 1A). The term "vertical direction" refers to the upward-downward direction of the vehicle (i.e., in the +/–Z direction of the coordinate axes depicted in FIG. 1A). Therefore, a radial direction of the wheel bearing with respect to the rotational axis includes the +/–Y direction and the +/–Z direction of the coordinate axes depicted in FIG. 1A. As used herein, "upper", "upward", and "above" are defined as the +Z direction of the coordinate axes shown in the drawings. "Lower", "downward", and "below" are defined as the –Z direction of the coordinate axes shown in the drawings.

Referring to FIGS. 1A-1D, a wheel bearing assembly 10 is depicted in various views. FIG. 1A depicts a prospective view of the wheel bearing assembly 10. The wheel bearing assembly 10 includes an outer ring 100 and a wheel hub 200 rotating relative to the outer ring 100. The outer ring 100 may include an outer ring flange 110 which may be coupled to vehicle suspension structure by one or more securing elements (e.g., studs, bolts, or the like). The outer ring 100 has an inboard surface 112 facing the inboard direction. The wheel hub 200 includes a hub flange 210, and a wheel of the vehicle may be coupled to the hub flange 210. The wheel hub 200 and the outer ring 100 are configured to rotate around a rotational axis 5 with respective to each other. It is noted that an axis direction (i.e., a direction along the rotational axis 5) corresponds to the +/–X direction of the coordinate axes depicted in FIG. 1A. It is also noted that a radial direction with respect to the rotational axis 5 corresponds to the +/–Y direction and the +/–Z direction.

Figure 1B:
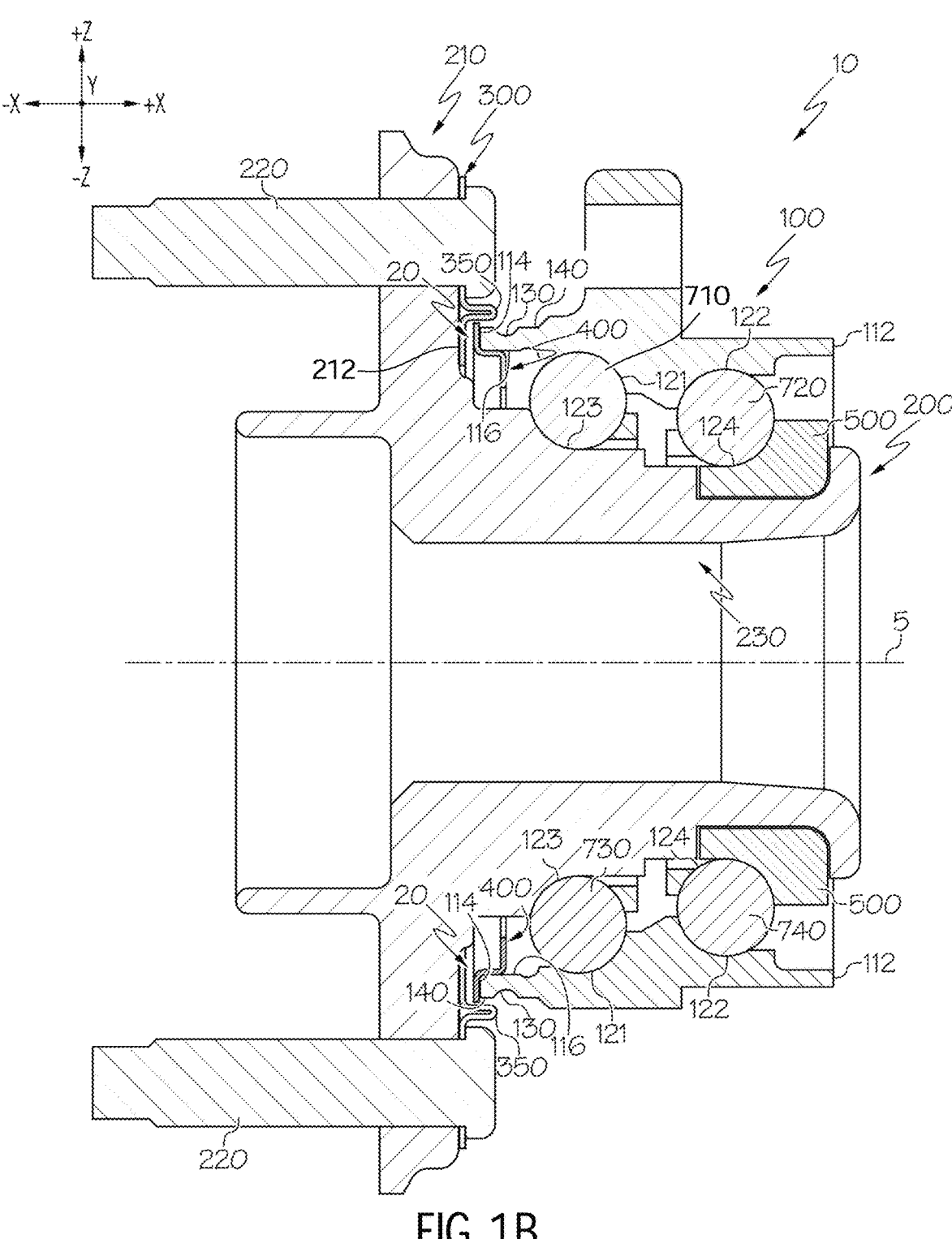
FIG. 1B schematically depicts a cross-sectional view of the wheel bearing assembly taken along the line 1B-1B of FIG. 1A, according to one or more embodiments shown and described herein.

Referring to FIG. 1B, the outer ring 100 may be disposed over a shaft portion 230 of the wheel hub 200. An inner ring 500 may be disposed between the outer ring 100 and the shaft portion 230. A plurality of rolling elements 710, 720, 730, 740 (e.g., balls, rollers such as tapered rollers, or the like) rotatably couple the outer ring 100 and the wheel hub 200. Although four rolling elements are shown in FIG. 1B, it is noted that different quantity of rolling elements may be utilized. For example, the rolling elements 710, 720, 730, 740 may constitute a single row bearing or a multiple row bearing including a double row bearing as shown in FIG. 1B. The rolling elements 710, 720, 730, 740 may be disposed between the outer ring 100 and the wheel hub 200 and/or between the outer ring 100 and the inner ring 500. The outer ring 100 defines one or more raceways 121 and 122. The raceways 121, 122 may be curved to accommodate the rolling elements 710, 720, 730, 740. The wheel hub 200 defines a raceway 123 and the inner ring 500 defines a raceway 124.

The outer ring 100 is spaced a gap 20 apart from the hub flange 210 in the axial direction. The gap 20 is formed between an inboard surface 212 of the hub flange 210 and an outboard surface 114 of the outer ring 100 (e.g., the most outboard surface of the outer ring 100). The inboard surface 212 faces the inboard direction, and the outboard surface 114 faces the outboard direction. At the gap 20, the inboard surface 212 and the outboard surface 114 face each other. The outer ring 100 may include a radial groove 130 on a radial outer surface 140 of the outer ring 100. For example, the radial groove 130 may radially extend and radially surround the radial outer surface 140 of the outer ring 100. The radial groove 130 may form a labyrinth seal which may prevent fluid and/or particles from entering a space between the outer ring 100 and the wheel hub 200. A radial inner surface 116 of the outer ring 100 may be disposed opposite to the radial outer surface 140.

Still referring to FIG. 1B, a first spacer 300 is disposed between the inboard surface 212 of the hub flange 210 and the outboard surface 114 of the outer ring 100. The first spacer 300 may have an annular shape that radially surrounds the shaft portion 230 of the wheel hub 200. The first spacer 300 may be disposed on the hub flange 210 and secured by one or more securing elements 220 (e.g., studs, screws, bolts, or the like). For example, the first spacer 300 may be secured on the inboard surface 212 by the securing elements 220 such that the position of the first spacer 300 is fixed with respect to the inboard surface 212. The first spacer 300 may include a folded portion 350 which will be discussed later in conjunction with FIG. 1D.

A second spacer 400 is disposed between the first spacer 300 and the outboard surface 114 of the outer ring 100. The second spacer 400 may have an annular shape that radially surrounds the shaft portion 230 of the wheel hub 200. The second spacer 400 may be disposed on the outer ring 100 and secured over the outer ring 100. The second spacer 400 may be secured on the outboard surface 114 of the outer ring 100 without using securing components. For example, an interference fit, also known as a press fit or friction fit, may be used to hold the second spacer 400 and the outer ring 100 together by friction. For example, the second spacer 400 may be pushed toward the outer ring 100. Also, for example, the second spacer 400 may be sized to securely fit over the outer ring 100 such that the position of the second spacer 400 is fixed with respect to the outer ring 100. Alternatively, the second spacer 400 may be secured to the outer ring 100 by one or more securing components (e.g., studs, screws, bolts, or the like) (not shown).

At least a portion of the first spacer 300 and at least a portion of the second spacer 400 are disposed in the gap 20. In embodiments, at least a portion of the first spacer 300 is overlapped with at least a portion of the second spacer 400 in the axial direction in the gap 20. The first spacer 300 and the second spacer 400 may be made of a sheet material, which may include sheet metal or non-metallic sheet. For example, sheet metal may be made of steel (e.g., JIS SPCC or SAE A366 or the like). For example, non-metallic sheet may be made of any durable materials that may resist wear during impact. The material of the first spacer 300 and the second spacer 400 may be the same or may be different. The sheet material may have thickness to fit in the gap 20. The gap 20 may be sized to receive the first spacer 300 and the second spacer 400. The thickness of each of the first spacer 300 and the second spacer 400 may be about 1 mm to about 1.5 mm. In some embodiments, the thickness of each of the first spacer 300 and the second spacer 400 may be less than 1 mm or greater than 1.5 mm. An axial distance between the first spacer 300 and the second spacer 400 may be about 0.04 mm to about 0.30 mm. Therefore, the gap 20 may be about 2.04 mm to about 3.30 mm. In some embodiments, the axial distance between the first spacer 300 and the second spacer 400 may be about 0.04 mm to about 0.60 mm.

Figure 1C:
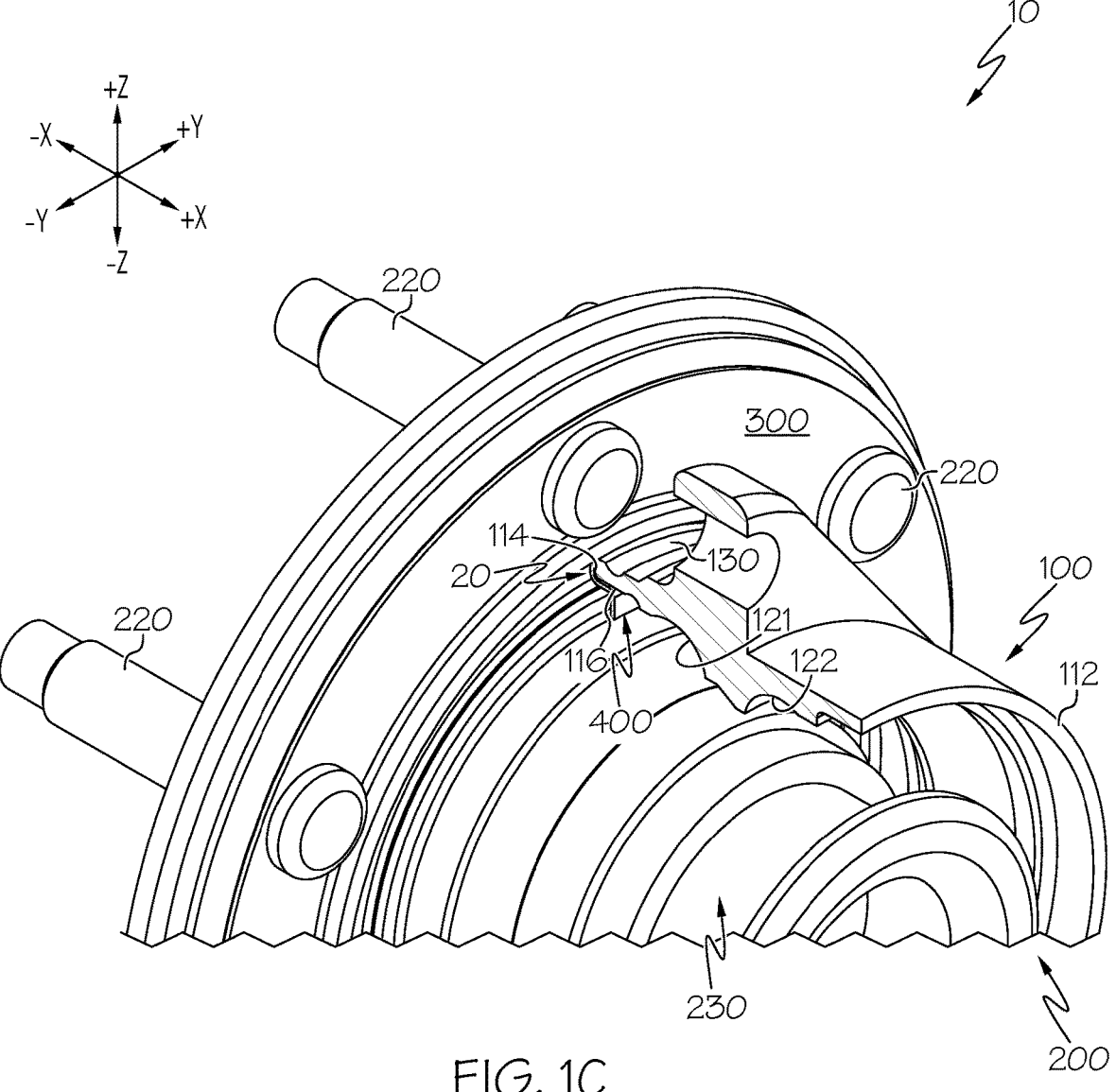
FIG. 1C schematically depicts a partial cross-sectional view of an outer ring of the wheel bearing assembly of FIG. 1A, according to one or more embodiments shown and described herein.

Referring to FIG. 1C, a partial cross-sectional view of the outer ring 100 is depicted to show obstructed structure of the wheel bearing assembly 10. The inner ring 500 is not shown in FIG. 1C. As discussed above, each of the first spacer 300 and the second spacer 400 may have an annular shape that radially surrounds the shaft portion 230. The gap 20 may facilitate an impact load force path to the rolling elements 710, 720, 730, 740 and raceways 121, 122, 123, 124 (FIG. 1B). Generally, Brinell damage is caused by a lateral impact (e.g., an impact in the inboard-outboard direction or the axial direction). Brinell damage may include dents in the raceways 121, 122, 123, 124 where the rolling elements 710, 720, 730, 740 contact. Brinell damage may include dents in the rolling elements 710, 720, 730, 740. The gap 20 may allow some lateral impact to be transferred through the gap 20 instead of the lateral impact going through the raceways 121, 122, 123, 124. Also, the first spacer 300 and the second spacer 400 may allow some lateral impact to be transferred through the first spacer 300 and the second spacer 400 and thus may reduce Brinell damage from the lateral impact.

Figure 1D:
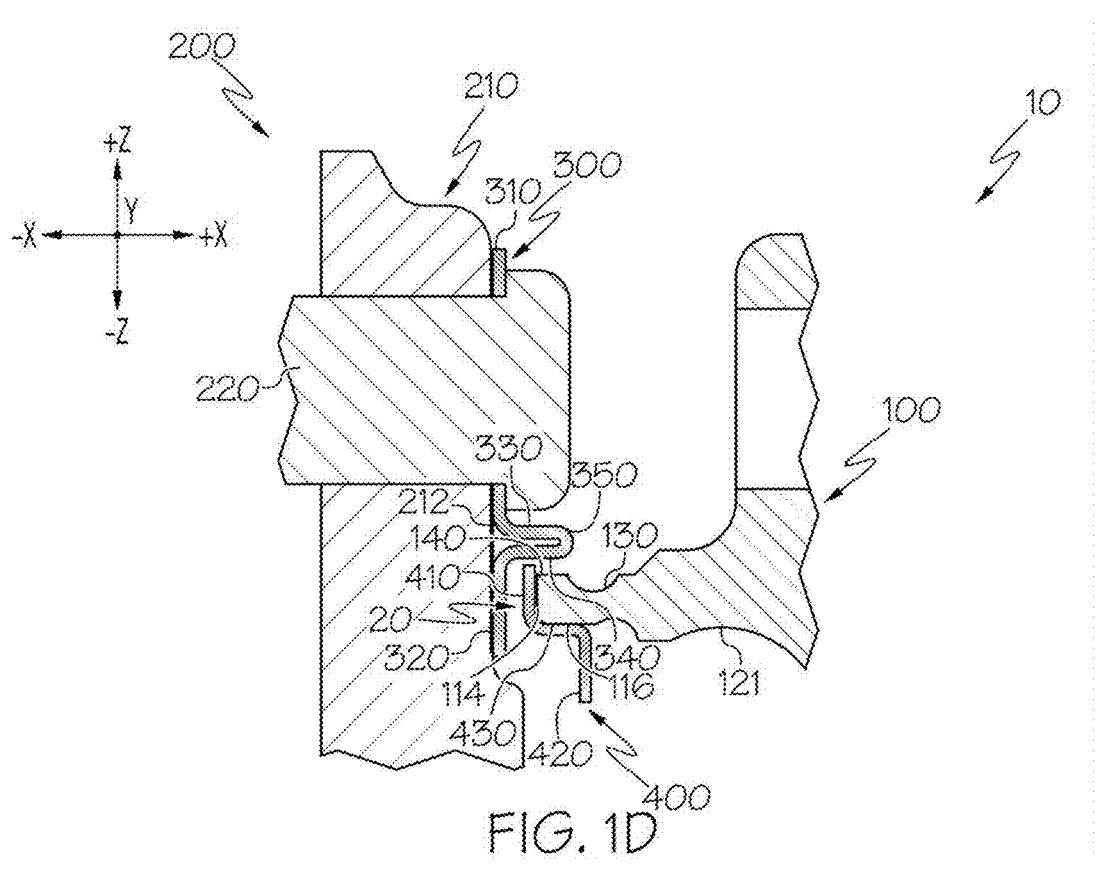
FIG. 1D schematically depicts a partial cross-sectional view of a first spacer and a second spacer of the wheel bearing assembly of FIG. 1A, according to one or more embodiments shown and described herein.

In embodiments, referring to FIG. 1D, the first spacer 300 may include a radially extending outer portion 310. The radially extending outer portion 310 may be coupled to the hub flange 210 via the securing elements 220. For example, the radially extending outer portion 310 may define one or more holes in which respective securing elements 220 may be inserted to secure the first spacer 300 onto the inboard surface 212. The radially extending outer portion 310 may be connected to an axially extending outer portion 330. The axially extending outer portion 330 may extend from an axially extending inner portion 340 in the axial direction toward the inboard surface 212 of the hub flange 210. In other words, the axially extending outer portion 330 may extend from the radially extending outer portion 310 in the axial direction away from the inboard surface 212. The axially extending inner portion 340 and the axially extending outer portion 330 may be connected via the folded portion 350. The folded portion 350 may be folded away from the inboard surface 212 of the hub flange 210.

The axially extending inner portion 340 may extend in the axial direction to cover the radial outer surface 140 of the outer ring 100. For example, the axially extending inner portion 340 may radially cover the gap 20. Also, the axially extending inner portion 340 may radially cover the second spacer 400, for example, at least an outer portion 410 of the second spacer 400. In embodiments, the radial groove 130 may be uncovered in the radial direction by the axially extending inner portion 340 of the first spacer 300. In other words, the axially extending inner portion 340 may not extend over the radial groove 130. For example, the radial groove 130 may be completely uncovered or partially uncovered.

Alternatively, the axially extending inner portion 340 and the axially extending outer portion 330 may constitute a single layer as an axially extending portion axially extending out or protruding from the first spacer 300 without having the folded portion 350. It is noted that the axially extending portion of the alternative embodiments may provide similar functions as the axially extending inner portion 340 as described above. For example, the axially extending portion may cover the second spacer 400, for example, at least the outer portion 410 of the second spacer 400. In embodiments, the radial groove 130 may be uncovered in the radial direction by the axially extending portion of the first spacer 300. In other words, the axially extending portion may not extend over the radial groove 130. For example, the radial groove 130 may be completely uncovered or partially uncovered.

The axially extending inner portion 340 of the axially extending portion may be connected to a radially extending inner portion 320. The radially extending inner portion 320 may be disposed over the inboard surface 212 of the hub flange 210, and thus cover the inboard surface 212.

Still referring to FIG. 1D, the second spacer 400 may include a radially extending outer portion 410 extends in the radial direction to cover the outboard surface 114 of the outer ring 100. The radially extending outer portion 410 may radially extend beyond the radial outer surface 140 of the outer ring 100. The radially extending outer portion 410 may be connected to an axially extending inner portion 430. The axially extending inner portion 430 may extend in the axial direction to cover the radial inner surface 116 of the outer ring 100. The axially extending inner portion 430 may be connected to a radially extending inner portion 420. At least the radially extending inner portion 320 and the radially extending outer portion 410 may be disposed in the gap 20.

Figure 2:
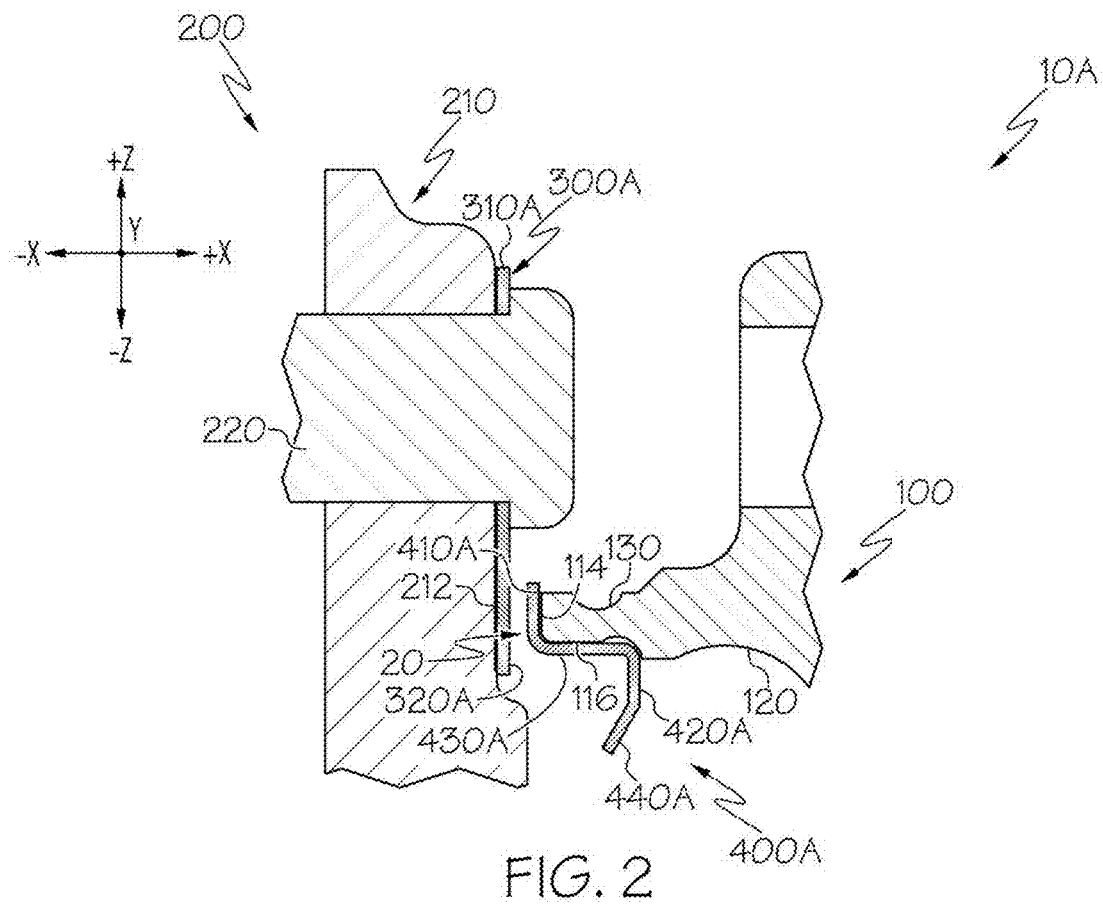
FIG. 2 schematically depicts a partial cross-sectional view of another embodiment of a first spacer and a second spacer, according to one or more embodiments shown and described herein.

Referring to FIG. 2, a wheel bearing assembly 10A including a first spacer 300A and a second spacer 400A is depicted. It is noted that the outer ring 100 and the wheel hub 200 of the wheel bearing assembly 10A are similar to the outer ring 100 and the wheel hub 200 of the wheel bearing assembly 10 which are annotated with the same element numbers. Therefore, it is understood that the components having the same element numbers may be considered to operate in the same manner as previously described and thus include each of the characteristics and alternatives as described above unless noted otherwise.

In embodiments, the first spacer 300A may include a radially extending outer portion 310A and a radially extending inner portion 320A. The radially extending outer portion 310A may be coupled to the hub flange 210 via the securing elements 220. For example, the radially extending outer portion 310A may define one or more holes in which respective securing elements 220 may be inserted to secure the first spacer 300A onto the inboard surface 212. The radially extending outer portion 310A may be connected to the radially extending inner portion 320A without a bend. For example, the first spacer 300A may have a flat annular shape.

Still referring to FIG. 2, the second spacer 400A may include a radially extending outer portion 410A extends in the radial direction to cover the outboard surface 114 of the outer ring 100. In embodiments, the radially extending outer portion 410A may entirely cover the outboard surface 114. In embodiments, the radially extending outer portion 410A may partially cover the outboard surface 114. In embodiments, the radially extending outer portion 410A may terminate where the outboard surface 114 terminates in a radial outer direction (e.g., the +Z direction). The radially extending outer portion 410A may be connected to an axially extending inner portion 430A. The axially extending inner portion 430A may extend in the axial direction to cover the radial inner surface 116 of the outer ring 100. The outer ring 100 may have an inner groove 132 on the radial inner surface 116. The axially extending inner portion 430A may extend to radially cover the inner groove 132. The axially extending inner portion 430A may be connected to a radially extending inner portion 420A. The radially extending inner portion 420A may be connected to an inclined portion 440A inclined toward the hub flange 210 in the outboard direction. At least the radially extending inner portion 320A and the radially extending outer portion 410A may be disposed in the gap 20.

Figure 3:
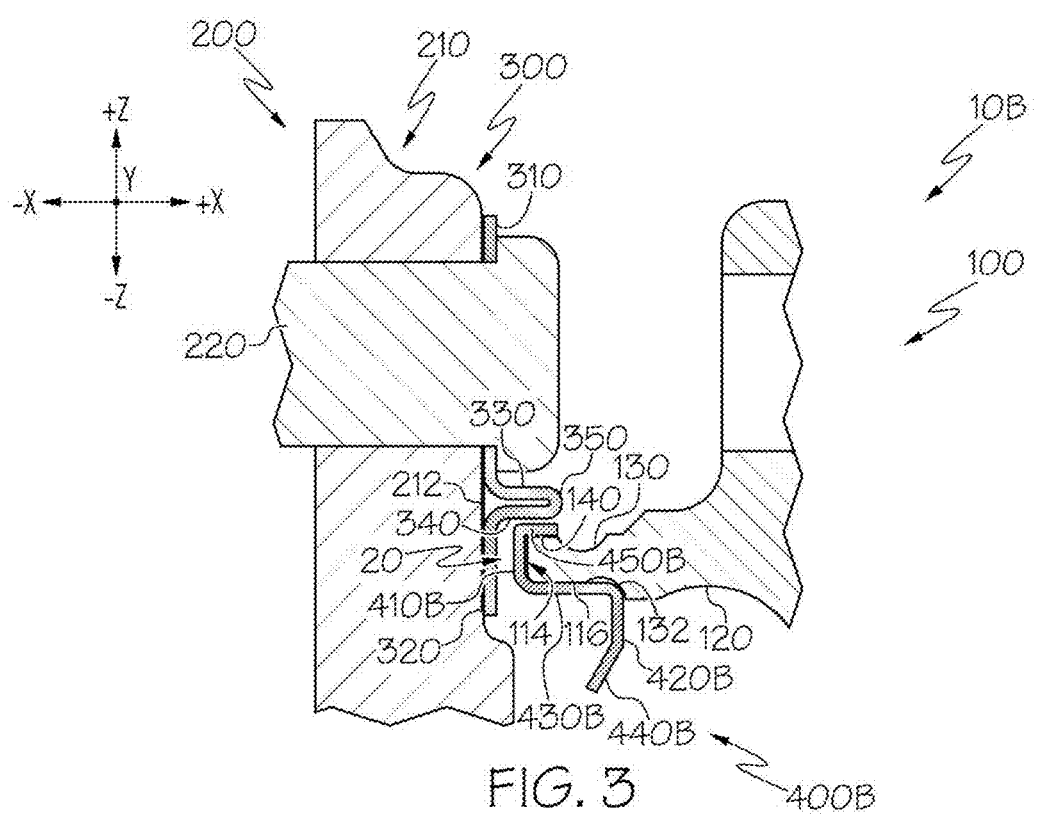
FIG. 3 schematically depicts a partial cross-sectional view of yet another embodiment of a first spacer and a second spacer, according to one or more embodiments shown and described herein.

Referring to FIG. 3, a wheel bearing assembly 10B including the first spacer 300 and a second spacer 400B is depicted. It is noted that the outer ring 100, the wheel hub 200, and the first spacer 300 of the wheel bearing assembly 10B are similar to the outer ring 100 and the wheel hub 200 of the wheel bearing assembly 10 which are annotated with the same element numbers. Therefore, it is understood that the components having the same element numbers may be considered to operate in the same manner as previously described and thus include each of the characteristics and alternatives as described above unless noted otherwise.

The second spacer 400B may include an axially extending outer portion 450B extending in the axial direction to cover the radial outer surface 140 of the outer ring 100. The second spacer 400B may form a labyrinth seal between the axially extending outer portion 450B and the radial outer surface 140 of the outer ring 100. The axially extending outer portion 450B may extend such that the radial groove 130 may be uncovered in the radial direction by the axially extending outer portion 450B. In other words, the axially extending outer portion 450B may not extend over the radial groove 130. For example, the radial groove 130 may be completely uncovered or partially uncovered. In embodiments, a labyrinth seal may be formed between the axially extending outer portion 450B and the axially extending inner portion 340 of the first spacer 300.

The axially extending outer portion 450B may be connected to a radially extending outer portion 410B extending in the radial direction to cover the outboard surface 114 of the outer ring 100. The radially extending outer portion 410B may be connected to an axially extending inner portion 430B. The axially extending inner portion 430B may extend in the axial direction to cover the radial inner surface 116 of the outer ring 100. The axially extending inner portion 430B may extend to radially cover the inner groove 132. The axially extending inner portion 430B may be connected to a radially extending inner portion 420B. The radially extending inner portion 420B may be connected to an inclined portion 440B inclined toward the hub flange 210 in the outboard direction. At least the radially extending inner portion 320 and the radially extending outer portion 410B may be disposed in the gap 20.

Figure 4:
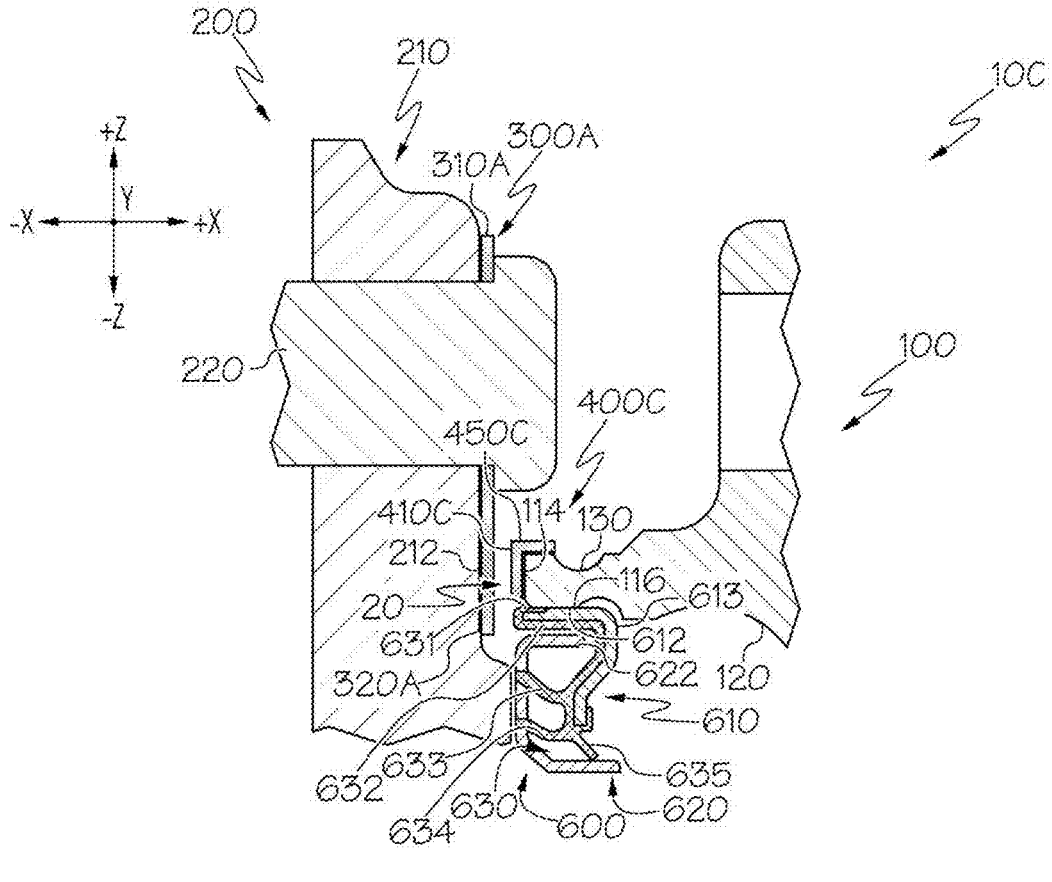
FIG. 4 schematically depicts a partial cross-sectional view of yet another embodiment of a first spacer and a second spacer with a seal, according to one or more embodiments shown and described herein.

Referring to FIG. 4, a wheel bearing assembly 10C including the first spacer 300A and a second spacer 400C is depicted. It is noted that the outer ring 100, the wheel hub 200, and the first spacer 300A of the wheel bearing assembly 10C are similar to the outer ring 100, the wheel hub 200, and the first spacer 300A of the wheel bearing assembly 10A which are annotated with the same element numbers. Therefore, it is understood that the components having the same element numbers may be considered to operate in the same manner as previously described and thus include each of the characteristics and alternatives as described above unless noted otherwise.

The second spacer 400C may include an axially extending outer portion 450C extending in the axial direction to cover the radial outer surface 140 of the outer ring 100. The second spacer 400C may form a labyrinth seal between the axially extending outer portion 450C and the radial outer surface 140 of the outer ring 100. The axially extending outer portion 450C may extend such that the radial groove 130 may be uncovered in the radial direction by the axially extending outer portion 450C. In other words, the axially extending outer portion 450C may not extend over the radial groove 130. For example, the radial groove 130 may be completely uncovered or partially uncovered. In embodiments, a labyrinth seal may be formed between the axially extending outer portion 450C and the axially extending inner portion 340A of the first spacer 300A.

The axially extending outer portion 450C may be connected to a radially extending outer portion 410C extending in the radial direction to cover the outboard surface 114 of the outer ring 100. The radially extending outer portion 410C may terminate before reaching the radial inner surface 116 of the outer ring 100. At least the radially extending inner portion 320A and the radially extending outer portion 410C may be disposed in the gap 20.

Still referring to FIG. 4, the wheel bearing assembly 10C may further include a seal 600 (e.g., a slinger seal) disposed between the outer ring 100 and the shaft portion 230 of the wheel hub 200. The seal 600 may radially cover the radial inner surface 116. The seal 600 may have an annular shape around the shaft portion 230. The seal 600 may include an outer member 610, a slinger 620, and a sealing member 630.

The outer member 610 may be coupled to the outer ring 100. The outer member 610 may be made from a metal sheet, for example a steel sheet. The outer member 610 may be sized to fit with the radial inner surface 116 of the outer ring 100. For example, an axially extending end portion 612 may be inserted into the outer ring 100, and a radially extending end portion 613 may extend radially from the axially extending end portion 612.

The sealing member 630 may be formed integrally with the outer member 610. For example, the sealing member 630 may be overmolded with the outer member 610. The sealing member 630 may be made from a flexible material including, for example, rubber (e.g., nitrile butadiene rubber, fluoroelastomers, or the like), plastic, or the like. The sealing member 630 may include an outer end portion 631 and an inner portion 632 extending along a periphery of the outer member 610, and a first lip portion 633, a second lip portion 634, and a third lip portion 635 extending out from the inner portion 632.

The outer end portion 631 of the sealing member 630 may be disposed between the radial inner surface 116 of the outer ring 100 and the radially extending end portion 613 of the outer member 610. The outer end portion 631 may provide improved corrosion protection between the seal 600 and the outer ring 100. The inner portion 632 may extend along the periphery where the outer member 610 faces the slinger 620. The inner portion 632 may form a labyrinth seal between the inner portion 632 and the slinger 620, specifically an end portion 622 of the slinger 620. The labyrinth seal may reduce inflow of fluid or particles into the seal 600.

The first lip portion 633, the second lip portion 634, and the third lip portion 635 may extend from the inner portion 632 toward the slinger 620. Each of the first lip portion 633, the second lip portion 634, and the third lip portion 635 may contact the slinger 620 at a distal end respectively. For example, the first lip portion 633, the second lip portion 634, and the third lip portion 635 may be pressed onto the slinger 620. A lubricant, such as a grease or the like, may be applied between the distal ends of the first lip portion 633, the second lip portion 634, and the third lip portion 635 and the slinger 620. The first lip portion 633 and the second lip portion 634 may be inclined radially outward, and the third lip portion 635 may be inclined radially inward.

9
10

Figure 5:
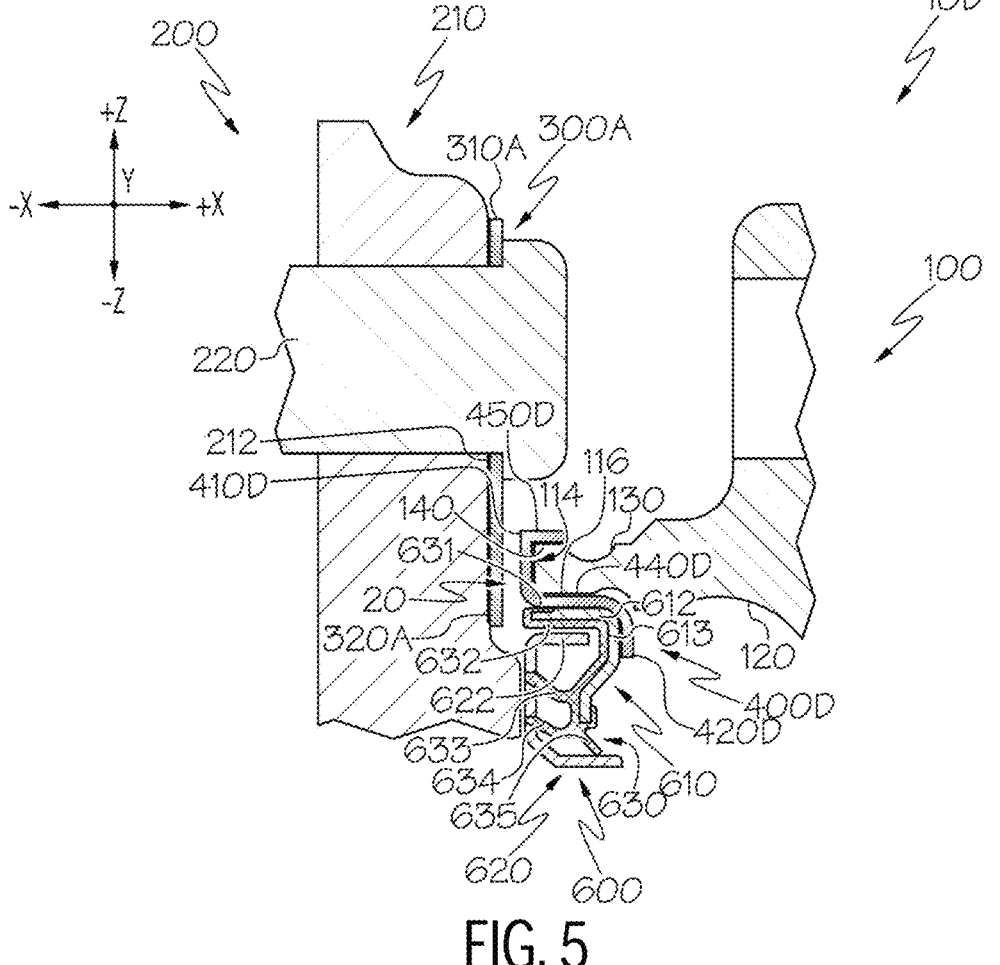
FIG. 5 schematically depicts a partial cross-sectional view of yet another embodiment of a first spacer and a second spacer with a seal, according to one or more embodiments shown and described herein.

Referring to FIG. 5, a wheel bearing assembly 10D including the first spacer 300A, a second spacer 400D, and the seal 600 is depicted. It is noted that the outer ring 100, the wheel hub 200, and the first spacer 300A of the wheel bearing assembly 10D are similar to the outer ring 100, the wheel hub 200, and the first spacer 300A of the wheel bearing assembly 10A which are annotated with the same element numbers. It is also noted that the seal 600 of the wheel bearing assembly 10D is similar to the seal 600 of the wheel bearing assembly 10C. Therefore, it is understood that the components having the same element numbers may be considered to operate in the same manner as previously described and thus include each of the characteristics and alternatives as described above unless noted otherwise.

The second spacer 400D may include an axially extending outer portion 450D extending in the axial direction to cover the radial outer surface 140 of the outer ring 100. The second spacer 400D may form a labyrinth seal between the axially extending outer portion 450D and the radial outer surface 140 of the outer ring 100. The axially extending outer portion 450D may extend such that the radial groove 130 may be uncovered in the radial direction by the axially extending outer portion 450D. In other words, the axially extending outer portion 450D may not extend over the radial groove 130. For example, the radial groove 130 may be completely uncovered or partially uncovered. In embodiments, a labyrinth seal may be formed between the axially extending outer portion 450D and the axially extending inner portion 340A of the first spacer 300A.

The axially extending outer portion 450D may be connected to a radially extending outer portion 410D extending in the radial direction to cover the outboard surface 114 of the outer ring 100. The radially extending outer portion 410D may be connected to an axially extending inner portion 440D. The axially extending inner portion 440D may be disposed between the outer ring 100 and the seal 600. At least the radially extending inner portion 320A and the radially extending outer portion 410D may be disposed in the gap 20.

The axially extending inner portion 440D may be connected to a radially extending inner portion 420D. The radially extending inner portion 420D extends radially along the periphery of the outer member 610.

It is noted that combinations of any one of the first spacers 300, 300A and any one of the second spacers 400, 400A, 400B, 400C, 400D may be used to configure a wheel bearing assembly in addition to various embodiments described herein. Also, embodiments of wheel bearing assemblies may or may not include the seal 600.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

It should be understood that embodiments, alternative embodiments, and/or materials used in the construction of embodiments or alternative embodiments, are applicable to all other embodiments described herein.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A wheel bearing assembly, comprising:
an outer ring;
a wheel hub rotating relative to the outer ring, the wheel hub including a hub flange, an inboard surface of the hub flange facing an outboard surface of the outer ring and spaced a gap apart from the outboard surface of the outer ring in an axial direction;
a plurality of rolling elements rotatably coupling the outer ring and the wheel hub;
a first spacer disposed between the inboard surface of the hub flange and the outboard surface of the outer ring, the first spacer including an axially extending inner portion extending in the axial direction to cover a radial outer surface of the outer ring, and the first spacer including an axially extending outer portion extending from the axially extending inner portion in the axial direction toward the inboard surface of the hub flange; and
a second spacer disposed between the first spacer and the outboard surface of the outer ring,
wherein at least a portion of the first spacer and at least a portion of the second spacer are disposed in the gap.

2. The wheel bearing assembly of claim 1, wherein the outer ring includes a radial groove on the radial outer surface of the outer ring.

3. The wheel bearing assembly of claim 2, the radial groove is uncovered in a radial direction by the axially extending inner portion of the first spacer.

4. The wheel bearing assembly of claim 1, wherein the axially extending inner portion and the axially extending outer portion of the first spacer are connected via a folded portion.

5. The wheel bearing assembly of claim 4, wherein the folded portion is folded away from the inboard surface of the hub flange.

6. The wheel bearing assembly of claim 1, wherein the second spacer includes a radially extending outer portion that extends in a radial direction to cover the outboard surface of the outer ring.

7. The wheel bearing assembly of claim 6, wherein the radially extending outer portion radially extends beyond the radial outer surface of the outer ring.

8. The wheel bearing assembly of claim 1, wherein the second spacer includes an axially extending inner portion that extends in the axial direction to cover a radial inner surface of the outer ring.

9. The wheel bearing assembly of claim 8, wherein the second spacer includes an axially extending outer portion to cover the radial outer surface of the outer ring.

10. The wheel bearing assembly of claim 8, wherein the first spacer and the second spacer form a labyrinth seal.

11. The wheel bearing assembly of claim 8, wherein the outer ring includes a radial groove on a radial outer surface of the outer ring, the radial groove is uncovered in a radial direction by the axially extending outer portion of the second spacer.

12. The wheel bearing assembly of claim 10, wherein the axially extending inner portion of the second spacer is disposed between the outer ring and a seal.

13. The wheel bearing assembly of claim 12, wherein the seal is a slinger seal.

14. The wheel bearing assembly of claim 1, wherein the first spacer and the second spacer are made of a sheet material.

15. The wheel bearing assembly of claim 14, wherein the sheet material is metal.

16. A vehicle comprising:

a wheel bearing assembly configured to be coupled to a wheel of the vehicle, the wheel bearing comprising:

an outer ring;

a wheel hub rotating relative to the outer ring, the wheel hub including a hub flange, an inboard surface of the hub flange facing an outboard surface of the outer ring and spaced a gap apart from the outboard surface of the outer ring in an axial direction;

a plurality of rolling elements rotatably coupling the outer ring and the wheel hub;

a first spacer disposed between the inboard surface of the hub flange and the outboard surface of the outer ring; and a second spacer disposed between the first spacer and the outboard surface of the outer ring, the second spacer includes a radially extending outer portion that extends in a radial direction to cover the outboard surface of the outer ring, and an axially extending inner portion that extends in the axial direction to cover a radial inner surface of the outer ring, and a radially extending inner portion;

wherein the radially extending inner portion is axially spaced from the radially extending outer portion with the axially extending inner portion disposed axially between the radially extending inner portion and the radially extending outer portion; and wherein at least a portion of the first spacer and at least a portion of the second spacer are disposed in the gap, and wherein the first spacer includes an axially extending inner portion extending in the axial direction to cover a radial outer surface of the outer ring, and the first spacer includes an axially extending outer portion extending from the axially extending inner portion in the axial direction toward the inboard surface of the hub flange.

17. The vehicle of claim 16, wherein the second spacer includes an inclined portion connected to the radially extending inner portion, the inclined portion being inclined toward the hub flange.

18. A wheel bearing assembly, comprising:

an outer ring;

a wheel hub rotating relative to the outer ring, the wheel hub including a hub flange, an inboard surface of the hub flange facing an outboard surface of the outer ring and spaced a gap apart from the outboard surface of the outer ring in an axial direction;

a plurality of rolling elements rotatably coupling the outer ring and the wheel hub;

a first spacer disposed between the inboard surface of the hub flange and the outboard surface of the outer ring; and a second spacer disposed between the first spacer and the outboard surface of the outer ring;

wherein at least a portion of the first spacer and at least a portion of the second spacer are disposed in the gap;

wherein the second spacer includes an axially extending inner portion that extends in the axial direction to cover a radial inner surface of the outer ring;

wherein the axially extending inner portion of the second spacer is disposed between the outer ring and a seal; and wherein the seal is a slinger seal.

* * * * *